United States Patent
Saxe

(10) Patent No.: US 10,318,735 B2
(45) Date of Patent: Jun. 11, 2019

(54) METHODS AND APPARATUS FOR DETECTING WHETHER A STRING OF CHARACTERS REPRESENTS MALICIOUS ACTIVITY USING MACHINE LEARNING

(71) Applicant: Invincea, Inc., Fairfax, VA (US)

(72) Inventor: Joshua Daniel Saxe, Los Angeles, CA (US)

(73) Assignee: Invincea, Inc., Reston, VA (US)

(*) Notice: Subject to any disclaimer, the term of this patent is extended or adjusted under 35 U.S.C. 154(b) by 147 days.

(21) Appl. No.: 15/630,495

(22) Filed: Jun. 22, 2017

(65) Prior Publication Data
US 2017/0372071 A1    Dec. 28, 2017

Related U.S. Application Data

(60) Provisional application No. 62/353,286, filed on Jun. 22, 2016.

(51) Int. Cl.
*G06N 3/04* (2006.01)
*G06N 3/08* (2006.01)
(Continued)

(52) U.S. Cl.
CPC .......... *G06F 21/567* (2013.01); *G06F 21/562* (2013.01); *G06N 3/04* (2013.01);
(Continued)

(58) Field of Classification Search
None
See application file for complete search history.

(56) References Cited

U.S. PATENT DOCUMENTS 6,226,629 B1  5/2001  Cossock
8,028,338 B1  9/2011  Schneider
(Continued)

FOREIGN PATENT DOCUMENTS

EP        3018879       5/2015
WO    WO 2017/223294    12/2017

OTHER PUBLICATIONS

Gibert, "Convolutional Neural Networks for Malware Classification", Oct. 20, 2016, A thresis presented for the degree of Master in Artificial Intelligence, p. 1-100.*
(Continued)

*Primary Examiner* — Christopher A Revak
(74) *Attorney, Agent, or Firm* — Cooley LLP

(57) ABSTRACT

In some embodiments, a processor can receive an input string associated with a potentially malicious artifact and convert each character in the input string into a vector of values to define a character matrix. The processor can apply a convolution matrix to a first window of the character matrix to define a first subscore, apply the convolution matrix to a second window of the character matrix to define a second sub score and combine the first subscore and the second subscore to define a score for the convolution matrix. The processor can provide the score for the convolution matrix as an input to a machine learning threat model, identify the potentially malicious artifact as malicious based on an output of the machine learning threat model, and perform a remedial action on the potentially malicious artifact based on identifying the potentially malicious artifact as malicious.

22 Claims, 10 Drawing Sheets

(51) Int. Cl.
G06F 21/56 (2013.01)
H04L 29/06 (2006.01)
G06N 5/00 (2006.01)
G06N 7/00 (2006.01)

(52) U.S. Cl.
CPC .............. *G06N 3/0454* (2013.01); *G06N 3/08* (2013.01); *G06N 3/084* (2013.01); *H04L 63/1416* (2013.01); *G06F 2221/032* (2013.01); *G06N 5/003* (2013.01); *G06N 7/005* (2013.01)

(56) References Cited

U.S. PATENT DOCUMENTS

| | | | |
|---|---|---|---|
| 8,095,981 | B2 | 1/2012 | Rabinovitch et al. |
| 8,291,497 | B1 | 10/2012 | Griffin |
| 8,505,094 | B1 | 8/2013 | Xuewen et al. |
| 8,521,667 | B2 | 8/2013 | Zhu et al. |
| 9,015,814 | B1 | 4/2015 | Zakorzhevsky |
| 9,672,358 | B1 | 6/2017 | Long et al. |
| 9,690,938 | B1 | 6/2017 | Saxe et al. |
| 9,705,904 | B1 | 7/2017 | Davis et al. |
| 9,910,986 | B1 | 3/2018 | Saxe et al. |
| 9,940,459 | B1 | 4/2018 | Saxe |
| 10,104,100 | B1 * | 10/2018 | Bogorad ............ H04L 63/1425 |
| 2005/0050335 | A1 | 3/2005 | Liang |
| 2005/0166046 | A1 | 7/2005 | Bellovin et al. |
| 2005/0187740 | A1 | 8/2005 | Marinescu |
| 2005/0223238 | A1 | 10/2005 | Schmid et al. |
| 2006/0015630 | A1 | 1/2006 | Stolfo |
| 2008/0127336 | A1 | 5/2008 | Sun |
| 2009/0044024 | A1 | 2/2009 | Oberheide et al. |
| 2009/0100055 | A1 | 4/2009 | Wang |
| 2009/0172815 | A1 | 7/2009 | Gu |
| 2009/0293125 | A1 | 11/2009 | Szor |
| 2010/0115620 | A1 | 5/2010 | Alme |
| 2011/0154495 | A1 | 6/2011 | Stranne |
| 2011/0179484 | A1 | 7/2011 | Tuvell |
| 2011/0214161 | A1 | 9/2011 | Stolfo et al. |
| 2012/0158626 | A1 | 6/2012 | Zhu et al. |
| 2012/0159620 | A1 | 6/2012 | Seifert et al. |
| 2012/0210423 | A1 | 8/2012 | Friedrichs |
| 2012/0233693 | A1 | 9/2012 | Stites et al. |
| 2013/0167236 | A1 | 6/2013 | Sick |
| 2014/0090061 | A1 | 3/2014 | Avasarala |
| 2014/0298460 | A1 | 10/2014 | Xue et al. |
| 2015/0242626 | A1 | 8/2015 | Wang |
| 2015/0302268 | A1 * | 10/2015 | Collet ................... G06K 9/4604 382/197 |
| 2015/0312189 | A1 | 10/2015 | Lee |
| 2015/0379427 | A1 | 12/2015 | Dirac |
| 2016/0014149 | A1 | 1/2016 | Bradley |
| 2016/0239706 | A1 * | 8/2016 | Dijkman ............ G06K 9/00503 |
| 2017/0017795 | A1 | 1/2017 | DiGiambattista |
| 2017/0085585 | A1 * | 3/2017 | Morkovsk ........... H04L 63/1425 |
| 2017/0134404 | A1 * | 5/2017 | Machlica ............ H04L 63/1416 |
| 2018/0041536 | A1 | 2/2018 | Berlin |
| 2018/0285740 | A1 * | 10/2018 | Smyth .................... G06N 3/084 |

OTHER PUBLICATIONS

Kolosnjaji et al, "Empowering Convolutional Networks for Malware Classification and Analysis", no date provided, Technical University of Munich, p. 1-8.*
Office Action for U.S. Appl. No. 14/212,659, dated Nov. 13, 2017, 31 pages.
Office Action for U.S. Appl. No. 15/616,391, dated Sep. 22, 2017, 6 pages.
International Search Report and Written Opinion for International Application No. PCT/US2017/038715, dated Sep. 6, 2017, 8 pages.
Search Report for UK Patent Application No. GB 1712454.6, dated Jan. 15, 2018, 4 pages.
Avira Virus Lab, Natural language descriptor sample page, [Online], Retrieved from the Internet: <https://web.archive.org/web/20101006002848/https://www.avira.com/en/support-virus-lab>, Retrieved on Oct. 30, 2017, 2 pages.
Bulut, I. et al., "Mobile malware detection using deep neural network," Signal Processing and Communications Applications Conference (SIU), May 15-18, 2017 (with English Abstract).
Saxe, J. et al., "Deep Neural Network Based Malware Detection Using Two Dimensional Binary Program Features," 2015 10th International Conference on Malicious and Unwanted Software: "Know Your Enemy" (Malware), 2015, pp. 11-20.
Van Durme, B. et al., "Probabilistic counting with randomized storage," In Proceedings of the 21st International Joint Conference on Artificial Intelligence (IJCAI'09), Hiroaki Kitano (ed.). (2009), Morgan Kaufmann Publishers Inc., San Francisco, CA, USA, 1574-1579.
Office Action for U.S. Appl. No. 14/212,659 dated Jul. 22, 2016.
Final Office Action for U.S. Appl. No. 14/212,659 dated May 19, 2017.
Office Action for U.S. Appl. No. 14/716,290 dated Aug. 4, 2016.
Final Office Action for U.S. Appl. No. 14/716,290 dated Jun. 1, 2017.
Office Action for U.S. Appl. No. 15/228,728 dated Oct. 21, 2016.
V. Sai Sathyanarayan, et al., "Signature Generation and Detection of Malware Families". In Proceedings of the 13th Australasian conference on Information Security and Privacy (ACISP '08), Yi Mu, Willy Susilo, and Jennifer Seberry (Eds.). Springer-Verlag, Heidelberg, pp. 336-349.
Robert Morris, "Counting large numbers of events in small registers", Commun. ACM 21, Oct. 10, 1978, pp. 840-842.
ThreatExpert, Geographic Distribution of Threats—retrieved from the Internet—http://web.archive.org/web/20130115040419/http://threatexpert.com/dated Jan. 15, 2013.
Joshua Saxe, et al., "CrowdSource: Automated Inference of High Level Functionality from Low-Level Symbols Using a Crowd Trained Machine Learning Model," IEEE, 9th International Conference, Oct. 28, 2014, pp. 68-75.
Konstantin Berlin, et al., "Malicious Behavior Detection using Windows Audit Logs," Proceedings of the 8th ACM Workshop on Artificial Intelligence and Security, Oct. 16, 2015, pp. 35-44.
Joshua Saxe, et al., "Deep Neural Network Based Malware Detection Using Two Dimensional Binary Program Features," IEEE, Oct. 20, 2015, pp. 11-20.
Josh Saxe, et al., "Visualization of Shared System Call Sequence Relationships in Large Malware Corpora," Proceedings of the ninth internaitonal symposium on visualization for cyber security, ACM, Oct. 15, 2012, pp. 33-40.
Kent Griffin, et al., "Automatic Generation of String Signatures for Malware Detection," International Workshop on Recent Advances in Intrusion Detection. Springer Berlin Heidelberg, 2009.
Joshua Saxe, "Why Security Data Science Matters and How its Different: Pitfalls and Promises of Data Science Based Breach Detection and Threat Intelligence," Briefing, BlackHat USA2015, Aug. 1-6, 2015, Retrieved from the Internet—https://www.blackhat.com/us-15/briefings.html#Joshua-Saxe.
Joshua Saxe, "Why Security Data Science Matters and How its Different: Pitfalls and Promises of Data Science Based Breach Detection and Threat Intelligence," Presentation, BlackHat USA2015, Aug. 1-6, 2015.
Deguang Kong and Guanhua Yan, "Discriminant malware distance learning on structural information for automated malware classification", Proceedings of the 19th ACM SIGKDD international conference on Knowledge discovery and data mining, ACM, 2013.
Kolter, et al., "Learning to Detect and Classify Malicious Executable in the Wild," Journal of Machine Learning Research, vol. 7, 2006, pp. 2721-2744.
Saxe, Joshua, and Konstantin Berlin. "eXpose: A Character-Level Convolutional Neural Network with Embeddings for Detecting Malicious URLs, File Paths and Registry Keys." arXiv preprint arXiv:1702.08568 (2017).
Office Action for U.S. Appl. No. 14/212,659, dated Aug. 3, 2018, 32 pages.
Schroff, F. et al., "FaceNet: A Unified Embedding for Face Recognition and Clustering," Computer Vision Foundation, 2015 [online], Retrieved from the Internet: <URL: https://www.cv-foundation.org/

(56) References Cited

OTHER PUBLICATIONS openaccess/content_cvpr_2015/papers/Schroff_FaceNet_A_Unified_2015_CVPR_paper.pdf>, pp. 815-823.

Doersch, C., "Tutorial on Variational Autoencoders," arXiv:1606.05908v2 [stat.ML], Aug. 16, 2016, 23 pages.

Dahl, et al., "Large-scale malware classification using random projections and neural networks." International Workshop on Acoustic Signal Enhancment 2012, Institute of Electrical and Electronics Engineers (2013); 3422-3426.

Extended European Search Report for European Application No. 17816199.8 dated Apr. 9, 2019, 8 pages.

Wang, Y., et al., "A deep learning approach for detecting malicious JavaScript code." Security and Communications Networks (2016); 9(11): 1520-1534.

\* cited by examiner

… (1)

METHODS AND APPARATUS FOR DETECTING WHETHER A STRING OF CHARACTERS REPRESENTS MALICIOUS ACTIVITY USING MACHINE LEARNING

CROSS-REFERENCE TO RELATED APPLICATIONS

This application claims priority to and the benefit of U.S. Provisional Patent Application No. 62/353,286, filed Jun. 22, 2016 and titled "Methods and Apparatus for Detecting Whether a String of Characters Represents Malicious Activity Using Machine Learning," which is incorporated herein by reference in its entirety.

BACKGROUND

Embodiments described herein relate generally to efficiently processing string data structures, and more particularly to methods and apparatus for detecting whether a string of characters represents malicious activity (e.g., using machine learning).

In some known systems, string data structures can provide insight as to whether or not an artifact is malicious. For example, some known systems can process a string to predict whether or not an artifact is malicious. Such known systems, however, typically have difficulty determining whether relatively short strings relate to a malicious artifact. Additionally, such known systems can require the use of multiple models, each corresponding to a different analysis of the string, to determine whether or not the string indicates that the artifact is malicious. Further, an analyst typically specifies what would indicate, in the string file, that the artifact is malicious. As such, such known systems may not have the ability to learn malicious characteristics of artifacts.

Accordingly, a need exists for methods and apparatus that can process strings related to artifacts, without the use of multiple resource-intensive models, and without manual coding of malicious indicators.

SUMMARY

In some embodiments, a processor can receive an input string associated with a potentially malicious artifact and convert each character in the input string into a vector of values to define a character matrix. The processor can apply a convolution matrix to a first window of the character matrix to define a first subscore, apply the convolution matrix to a second window of the character matrix to define a second sub score and combine the first subscore and the second subscore to define a score for the convolution matrix. The processor can provide the score for the convolution matrix as an input to a machine learning threat model, identify the potentially malicious artifact as malicious based on an output of the machine learning threat model, and perform a remedial action on the potentially malicious artifact based on identifying the potentially malicious artifact as malicious.

DETAILED DESCRIPTION

Figure 1:
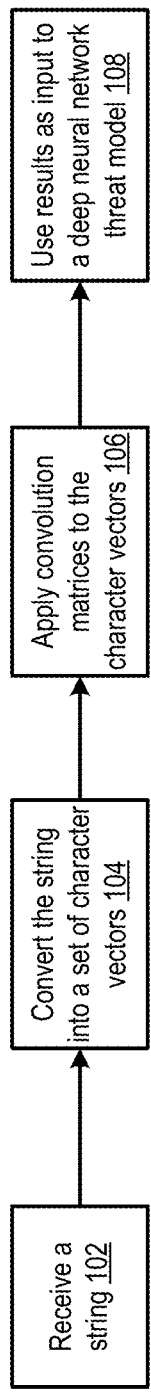
FIG. 1 is a flow diagram illustrating processing a string data structure, according to an embodiment.

In some implementations, a processor can receive a string associated with an artifact and can, for each character in the string, generate a vector of a predetermined length that represents that character, so as to generate a set of character vectors including each of the vectors generated for each character. The processor can apply a convolution matrix (also referred to as a kernel and/or a mask) to portions (e.g., windows) of the set of character vectors, to generate convolution matrix sub scores for those portions of the set of character vectors. The processor can combine the convolution matrix subscores and store the combined subscore in a feature vector, and can provide the feature vector as input to a threat model. The threat model can then process the feature vector and determine whether or not the string indicates that the artifact is malicious.

As used herein, an artifact can be or include, for example, any device, file and/or entity represented and/or associated with the string. For example, an artifact can include a function of software code, a webpage(s), a data file(s), a model file(s), a source file(s), a script(s), a binary executable file(s), a table(s) in a database system, a development deliverable(s), a word-processing document(s), an e-mail message(s), a text message, a network address, a device or entity and/or the like. For example, the artifact can be a webpage and the string associated with the artifact can be a Uniform Resource Locator (URL) used to access the webpage. For another example, the artifact can be a data file and the string associated with the data file can be a file path of the data file and/or contents of the data file. For yet another example, the artifact can be a script and the string associated with the script can be a function call within the script. For yet another example, the artifact can be a network-connected computing device (e.g., a server) and the string can be a network address (e.g., URL, Internet Protocol (IP) address, etc.) associated with the network-connected computing device.

In some implementations, methods and apparatuses disclosed herein can be used for detecting whether a string of characters represents malicious activity using machine learning. The apparatus includes a memory and a processor operatively coupled to the memory. The processor is configured to receive an input string associated with a potentially malicious artifact (for example, a Uniform Resource Locator (URL), a filepath, a registry key and/or the like) and convert each character in the input string into a vector of values to define a character matrix. The processor is then configured to select a convolution matrix and define a sub score by applying the convolution matrix on different sets of values within the character matrix. For example, the processor can define a first subscore by applying the convolution matrix to a first set of values within the character matrix, define a second sub score by applying the convolution matrix to a second set of values within the character matrix and so on. The processor can be configured to combine different subscores to calculate a score for the convolution matrix and provide the score as an input to a machine learning threat model. Based on an output of the machine learning threat model meeting a predefined criterion, the process can include identifying an artifact (e.g., a data file or a website) associated with the URL as malicious. Further, based on identifying the artifact as a malicious artifact, the process can also include performing a remedial action on the artifact (for example, quarantine the artifact).

In some implementations, an apparatus includes a memory and a processor operatively coupled to the memory. The processor can receive a URL associated with a website. The processor can be configured to convert each character in the URL into a vector of values to define a character matrix. The processor can then apply a first convolution matrix to a first set of values within the character matrix to define a first sub score and apply the first convolution matrix to a second set of values within the character matrix to define a second subscore. Further, the processor can calculate a sum based on the first subscore and the second subscore to define a score for the first convolution matrix. The processor can apply a second convolution matrix to the first set of values within the character matrix to define a third sub score and apply the second convolution matrix to the second set of values within the character matrix to define a fourth subscore. Further, the processor can calculate a sum based on the third subscore and the fourth subscore to define a score for the second convolution matrix. The processor can be configured to provide the score for the first convolution matrix and the score for the second convolution matrix as inputs to a machine learning threat model. The processor can be configured to identify an artifact associated with the URL as malicious based on an output of the machine learning threat model meeting a predefined criterion. The processor can be configured to quarantine the artifact associated with the URL based on the identifying the URL as malicious.

In some implementations, an example non-transitory processor-readable medium can store code representing instructions to be executed by a processor. The code can include code to cause the processor to receive an input string associated with a potentially malicious artifact. The code can further include code to convert each character in the input string into a vector of values to define a character matrix. The code can further include code to select a convolution matrix, apply the convolution matrix to a first window of the character matrix to define a first subscore, apply the convolution matrix to a second window of the character matrix to define a second sub score and combine the first sub score and the second sub score to define a score for the convolution matrix. The code can further include code to provide the score for the convolution matrix as an input to a machine learning threat model. The code can further include code identify the potentially malicious artifact associated with the input string as malicious based on an output of the machine learning threat model and perform a remedial action on the potentially malicious artifact based on identifying the potentially malicious artifact as malicious.

In some implementations, an example process can include receiving a Uniform Resource Locator (URL) associated with a website and converting each character in the URL into a vector of values to define a character matrix. The process can include applying a first convolution matrix to a set of values within the character matrix to define at least a portion of a first score and similarly, applying a second convolution matrix to the set of values within the character matrix to define at least a portion of a second score. The process can include providing the first score and the second score as inputs to a machine learning threat model. Based on an output of the machine learning threat model meeting a predefined criterion, the process can include identifying an artifact associated with the URL as malicious. Further based on the identified artifact as a malicious artifact, the process can also include performing a remedial action on the artifact.

FIG. 1 is a flow diagram illustrating processing a string data structure, according to an embodiment. For example, in some implementations, systems and methods herein describe a malware detection system in which strings relating to artifacts can be used to determine whether or not the artifact is malicious. For example, Universal Resource Locators (URLs), file paths, text in dialogue boxes for a program, short data messages, registry keys, and/or other related strings can each be used to determine whether or not an artifact is benign. A device configured to analyze potential malware can receive, at 102, a string, and can process the string so as to provide the processed string as input to a single malware model. For example, the device can convert, at 104, the string into a set of character vectors each representing a character in the string. Strings can be received from other devices, and/or a threat module within the device can receive the string from another program within that device.

The device can retrieve a set of convolution matrices and can apply, at 106, the set of convolution matrices to the set of character vectors (e.g., can calculate convolution scores and/or convolution matrix subscores based on performing mathematical operations on the set of character vectors, using the convolution matrices). The results of the application can be provided, at 108, as input to a threat model (e.g., a deep neural network threat model). The threat model can be trained such that the threat model is capable of predicting whether particular features of the string (based on the calculations performed with the convolution matrices) indicate that the artifact with which the string is associated, may be malware. Thus, the device can use the single threat model to determine whether or not the artifact is malicious, without the need for an analyst to manually indicate which features the threat model should analyze, and/or without the need for an analyst to manually indicate which features and/or values indicate a malicious artifact has been detected. Additionally, the device need not use multiple threat models to perform multiple tests on the string to determine whether or not the artifact is malicious.

Figure 2:
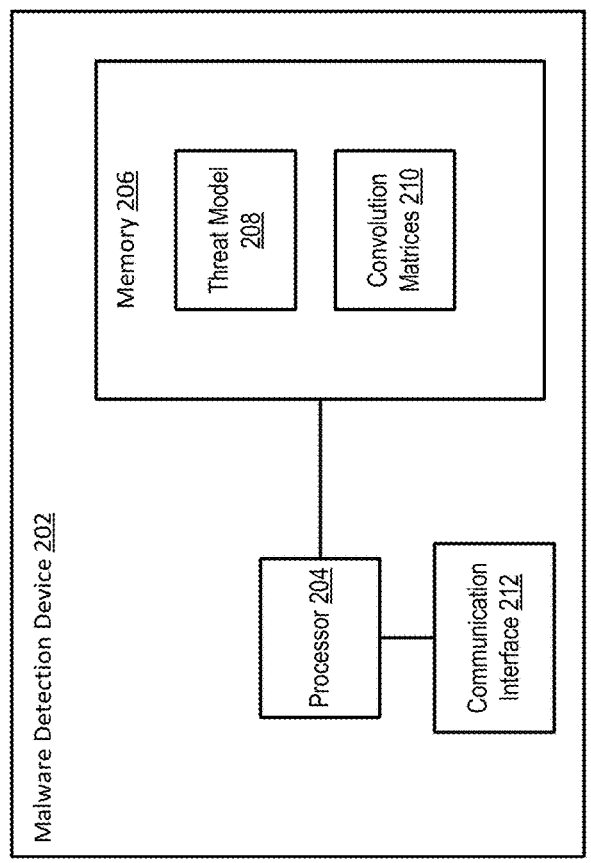
FIG. 2 is a schematic diagram illustrating a malware detection device, according to an embodiment.

FIG. 2 is a schematic diagram illustrating a malware detection device 202, according to an embodiment. For example, in some implementations, a malware detection device 202 can collect information relating to artifacts (e.g., including string data structures and/or other data relating to the artifacts), and can determine whether or not the artifacts are malicious or benign. For example, the malware detection device 202 can include at least one processor 204, at least one memory 206, and at least one communication interface 212. The communication interface 212 can be a wireless and/or wired interface that allows the malware detection device 202 to communicate with other devices (e.g., to receive strings, to send the results of processing the string, and/or to send and/or receive other information). For example, the communication interface 212 can be a Bluetooth, Wi-Fi, Ethernet, and/or similar interface that allows the device to communicate with other devices (either directly or via a network).

The at least one processor 204 can be any hardware module and/or component configured to receive and process data, and/or to execute code representing executable instructions. In some embodiments, the at least one processor 204 can be a general purpose processor, a Field Programmable Gate Array (FPGA), an Application Specific Integrated Circuit (ASIC), a Digital Signal Processor (DSP), and/or the like. The at least one memory 206 can be a hardware module and/or component configured to store data accessible by the at least one processor 204, and/or to store code representing executable instructions for execution by the at least one processor 204. The memory 206 can be, for example, a random access memory (RAM), a memory buffer, a hard drive, a database, an erasable programmable read-only memory (EPROM), an electrically erasable read-only memory (EEPROM), a read-only memory (ROM) and/or so forth. In some instances, the memory 206 stores instructions to cause the processor 204 to execute modules, processes and/or functions associated with the malware detection device 202 and/or system.

The at least one memory 206 can store information including, but not limited, to, a threat model 208 and/or a set of convolution matrices 210. The threat model 208 can be a deep neural network threat model, and/or a similar model, that can receive input about an artifact (e.g., a string associated with the artifact) and determine, using the input, whether or not the artifact is malicious or benign. In some implementations, the threat model 208 can be trained on artifacts, such that the threat model 208 can learn which features of artifacts (e.g., which strings of artifacts) may indicate that the artifact is malicious. Further information relating to training threat models 208 can be found in U.S. provisional patent application Ser. No. 62/201,263, entitled "METHODS AND APPARATUS FOR MACHINE LEARNING BASED MALWARE DETECTION", which is incorporated herein by reference in its entirety.

The set of convolution matrices 210 can be a collection of convolution matrices that can be applied to a set of character vectors to isolate and/or detect various features of the string from which the set of character vectors were derived. For example, a first convolution matrix 210 can be applied to the set of character vectors to generate a subscore for the string that is related to the source of the string. A second convolution matrix 210 can be applied to generate a subscore for the string that is related to the length of the string. In some instances, for example, as many as 1024 convolution matrices 210 (and/or other quantities of convolution matrices 210) can be applied to the set of character vectors, so as to generate values that represent various features of the string. The number of convolution matrices 210 used can depend on data associated with the string, the dimensions of the character vectors, a number of features that a threat model has requested for determining whether or not the artifact associated with the string is malicious, and/or based on other factors. Convolution matrices 210 can be of different sizes, can include different values, and/or the like.

In some implementations, the malware detection device 202 (e.g., via the at least one processor 204) can select a portion of the convolution matrices 210 to apply to the set of character vectors, e.g., based on the nature of the string (e.g., the at least one processor 204 can determine that, based on characteristics of the string, such as the source of the string and/or type of information represented by the string, certain features should be analyzed by the threat model 208, and therefore that certain convolution matrices 210 should be applied to the set of character vectors). For example, the at least one processor 204 can retrieve certain convolution matrices 210 that generate values relating to file types, file sizes, and/or similar features, when the at least one processor 204 receives strings from a particular source that has previously sent strings relating to artifacts having a common type, size, and/or having similar common features. In other implementations, the at least one processor 204 can apply each convolution matrix 210 stored in the at least one memory 206 to the set of character vectors, and the threat model 208 can determine how to weight the results from each convolution matrix 210 (e.g., can determine which features are important to analyze for a particular string value, based on the results of training the threat model 208). Similarly stated, the at least one processor 204 and/or the threat model 208 can be capable of determining features to analyze for each string, without input and/or manual coding by an analyst.

Figure 3:
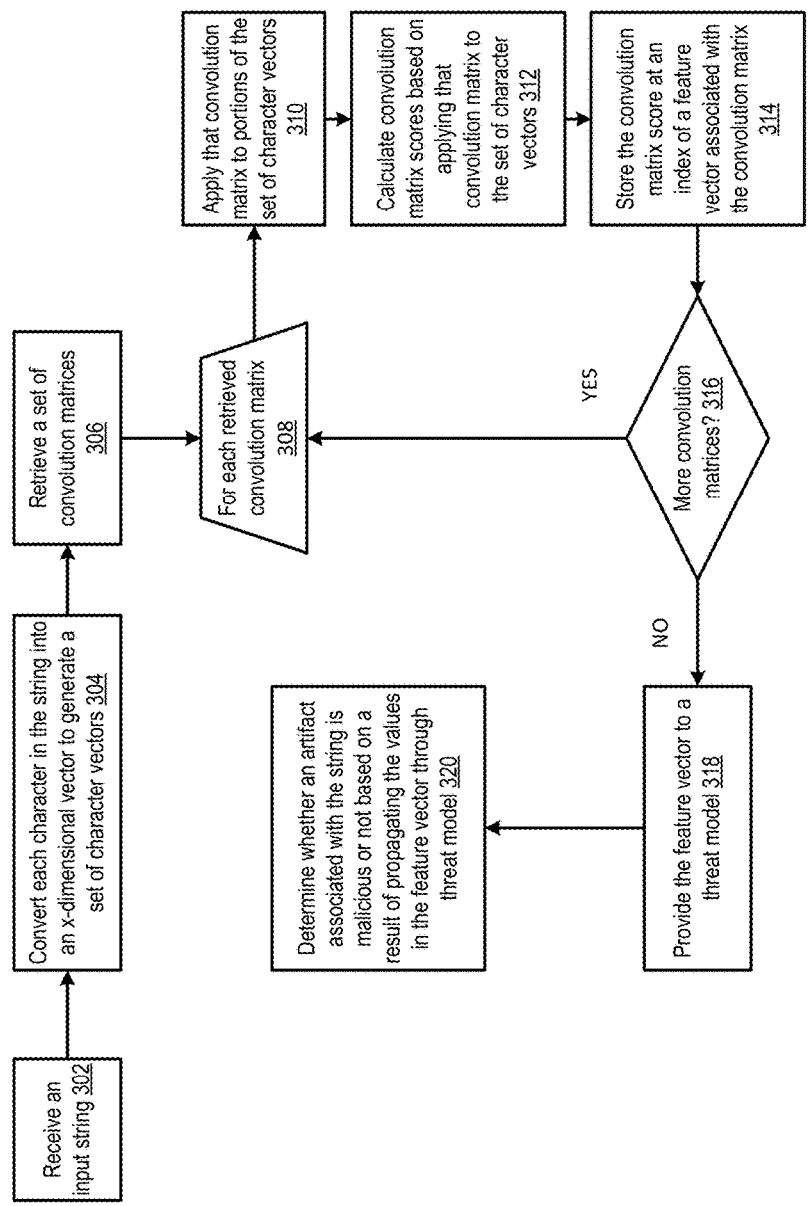
FIG. 3 is a logic flow diagram illustrating determining whether or not an artifact is malicious, according to an embodiment.

FIG. 3 is a logic flow diagram illustrating determining whether or not an artifact is malicious, according to an embodiment. For example, in some implementations, the malware detection device 202 (e.g., via the at least one processor 204) can receive, at 302, an input string (e.g., from a program and/or other software implemented on the malware detection device 202, from a device separate from the malware detection device 202, and/or the like). The input string can be of a pre-determined maximum length, and can be a string data structure including multiple character data structures. The at least one processor 204 can convert, at 304, each character in the string into an x-dimensional vector, so as to generate a set of character vectors (also referred to herein as a character matrix). For example, if a received string includes "evil.com," the at least one processor 204 can generate a first character vector for the character 'e,' a second character vector for the character 'v,' and so on. In some implementations, each character vector can be a 100-dimensional vector, and the values included in the character vector can be based on the Unicode value of that character (e.g., can be the Unicode value for that character, can be a hash value of the Unicode value, and/or can be a similar transformation of the Unicode value). In other implementations, the character vector can be of a different dimension, and/or can include values generated based on various other types of character encoding, such as American Standard Code for Information Interchange (ACSII), and/or similar character encoding schema.

In some implementations, characters having similar features, attributes and/or characteristics can have similar values and/or values within a similar range, within their respective character vectors. For example, uppercase letters can have similar values as other uppercase letters, lowercase letters can have similar values as other lowercase letters, numbers can have similar values as other numbers, special characters can similar values as other special characters, and/or the like. As another example, certain characters that are semantically important to identifying malware (e.g., tilde in the case of a URL string) can have values distinct from other characters. This allows semantic meaning of the characters to be appropriately represented by their respective character vectors. Moreover, the assigning of the character vectors to the characters can be optimized and trained through back-propagation. This can increase how reflective the character vector for each character is of that character's semantic meaning. This can also increase the similarities of the character vectors associated with like characters.

Figure 4:
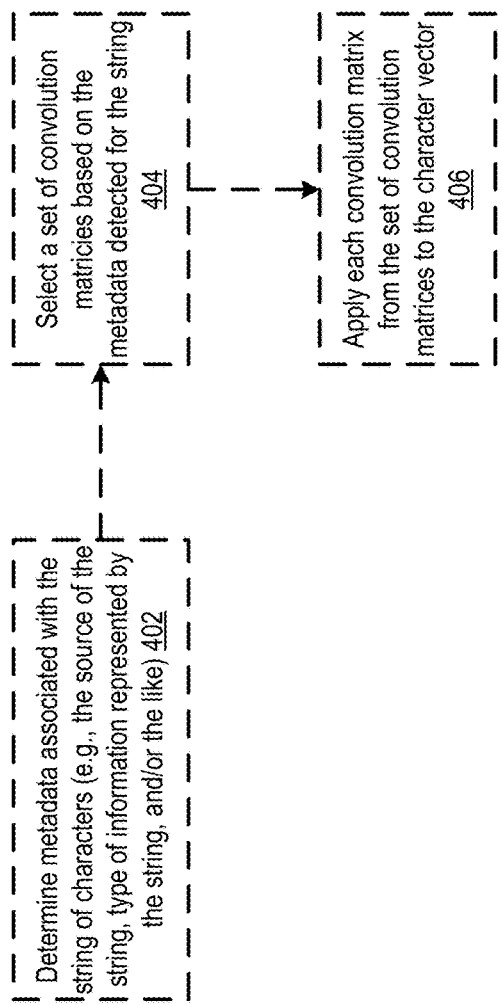
FIG. 4 is a logic flow diagram illustrating selecting convolution matrices, according to an embodiment.

The at least one processor 204 can retrieve, at 306, a set of convolution matrices (e.g., from the at least one memory 206). In some implementations, each of the convolution matrices 210 stored at the at least one memory 206 can be retrieved from the at least one memory 206. In other implementations, the convolution matrices 210 can optionally be selected based on information relating to the string. For example, referring to FIG. 4, in some implementations, the at least one processor 204 can determine, at 402, metadata associated with the string (e.g., including but not limited to the source of the string, the type of information represented by the string, a length of the string, and/or the like), and can select, at 404, a subset of the convolution matrices 210 stored at the at least one memory 206, based on the metadata retrieved. For example, the at least one processor 204 can determine that strings generated and/or sent by a particular source should be analyzed by applying a first set of convolution matrices 210 to the set of character vectors generated from that string. As another example, the at least one processor 204 can determine that strings over a predetermined length should be analyzed by applying a second set of convolution matrices 210 to the set of character vectors generated from that string.

The at least one processor 204 can apply, at 406, each retrieved convolution matrix 210 to the character vectors for the string. For example, returning to FIG. 3, the at least one processor 204 can, for each convolution matrix, at 308, retrieved from the at least one memory 206, apply, at 310, that convolution matrix to a portion of the set of character vectors (e.g., can select a "window" of the set of character vectors at which to apply that convolution matrix). The at least one processor 204 can apply that convolution matrix to multiple windows of the set of character vectors, and can calculate, at 312, convolution matrix scores for the set of character vectors based on applying that convolution matrix to the multiple windows of the set of character vectors. For example, the at least one processor 204 can calculate a convolution matrix subscore for each window at which that convolution matrix is applied, and can combine (e.g., add, average, and/or the like) the convolution matrix subscores to generate a final convolution matrix score for the set of character vectors using that convolution matrix.

The at least one processor 204 can store, at 314, the convolution matrix score to an index of a feature vector for the string that is associated with the convolution matrix. The feature vector can be a vector of a length and/or dimension corresponding to the number of convolution matrices being applied to the set of character vectors, and can be used as input to the threat model 208. Each index within the feature vector can be associated with a convolution matrix, and can store the convolution matrix score calculated with that convolution matrix. The at least one processor 204 can check, at 316, to determine whether there are more convolution matrices to apply to the set of character vectors. If there are additional convolution matrices to apply, the at least one processor 204 can continue to calculate convolution matrix scores using each of the convolution matrices.

When each of the convolution matrices has been applied to the set of character vectors, the at least one processor 204 can provide, at 318, the feature vector to a threat model 208 (e.g., a deep neural network threat model), e.g., as input to the model. For example, for a deep neural network threat model, the feature vector can be provided to each of the input nodes of the threat model 208, and/or different portions of the feature vector can be provided as input to different input nodes of the threat model 208. Based on the results of propagating the values from the feature vector through the threat model 208, the at least one processor 204 can determine, at 320, whether or not the string is associated with a malicious artifact. The at least one processor 204 can take remedial actions if the artifact is determined to be malicious (e.g., can delete and/or quarantine the artifact, can restrict access to the artifact, can blacklist the artifact, etc.), can send a notification indicating that the artifact is malicious (e.g., to a threat analyst, to a source device of the string, to other peer compute devices, and/or the like), and/or can take other actions when the artifact is determined to be malicious.

Figure 5:
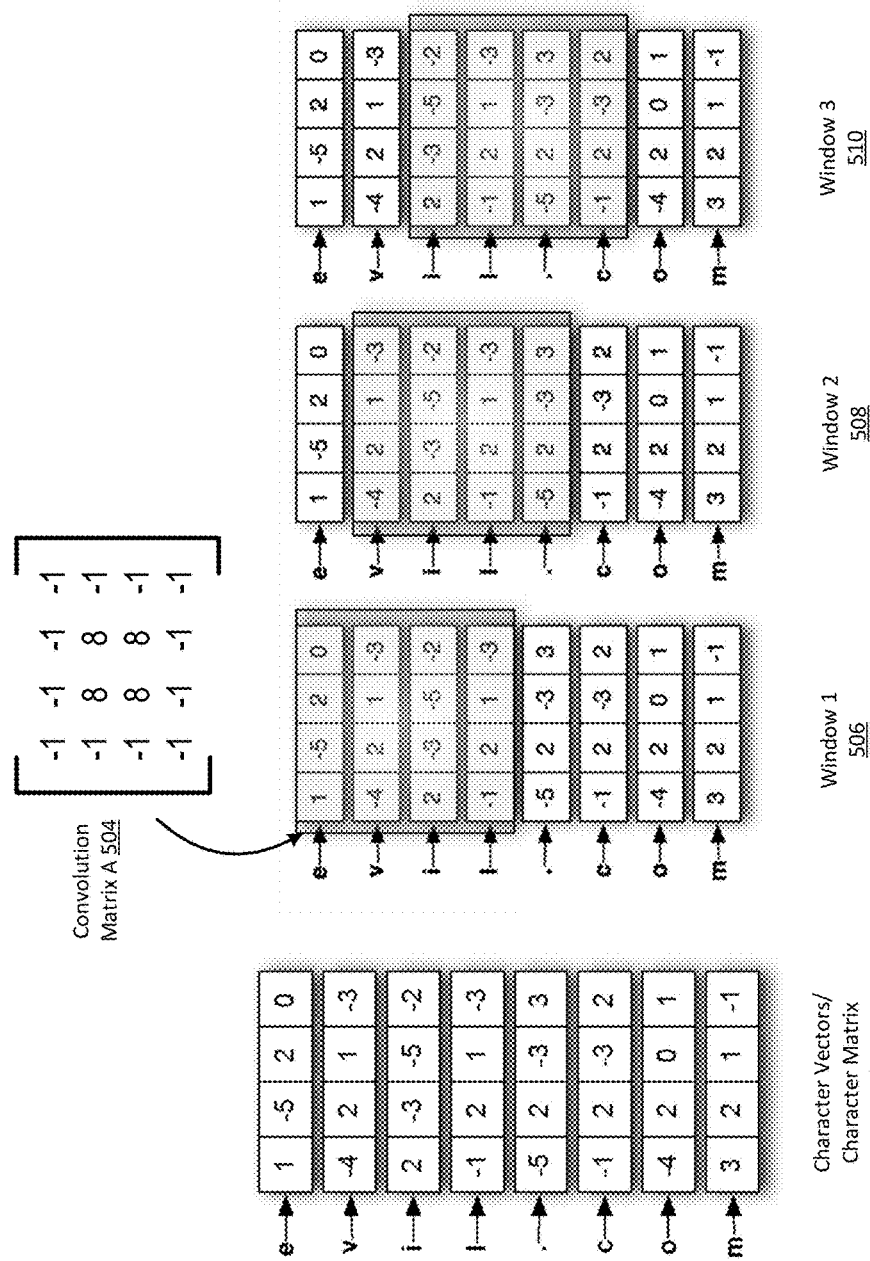
FIG. 5 is a diagram illustrating character vector windows, according to an embodiment.

FIG. 5 is a diagram illustrating character vector windows, according to an embodiment. For example, in some implementations, a set of character vectors can be stored and/or processed as a character matrix 502, where each row in the character matrix 502 represents a different character vector. When a convolution matrix is applied to the character matrix 502 (e.g., when convolution matrix A 504 is applied to the character matrix 502), the convolution matrix can be applied to various windows 506-510 of the character matrix 502. For example, a first window 506 can include the first four rows of the character matrix 502 (e.g., character vectors representing the first four characters of the string). The at least one processor 204 can perform a calculation using convolution matrix A 504 and the first window 506 so as to generate a first convolution matrix subscore for the character matrix, using convolution matrix A 504. The at least one processor 204 can then shift the window so as to define a different window (e.g., window 2 508) that includes rows 2-5 of the character matrix 502 (e.g., that has been shifted one row down in the character matrix 502). The at least one processor 204 can perform another calculation using convolution matrix A 504 and the second window 508 to generate a second convolution matrix subscore for the character matrix 502. The at least one processor 204 can continue to shift the window and perform similar calculations on a third window 510 that includes rows 3-6 of the character matrix 502, and fourth and fifth windows of the character matrix 502 (not shown), e.g., until each of the rows of the character matrix 502 has been included in at least one window. As such, any suitable number of windows can be used. Moreover, in some instances, the number of windows for a string is based on and/or proportional to the length of the string. Each subscore generated from calculations on each of the windows can be combined into a single score representing a convolution matrix A score for the character matrix 502.

Figure 6A:
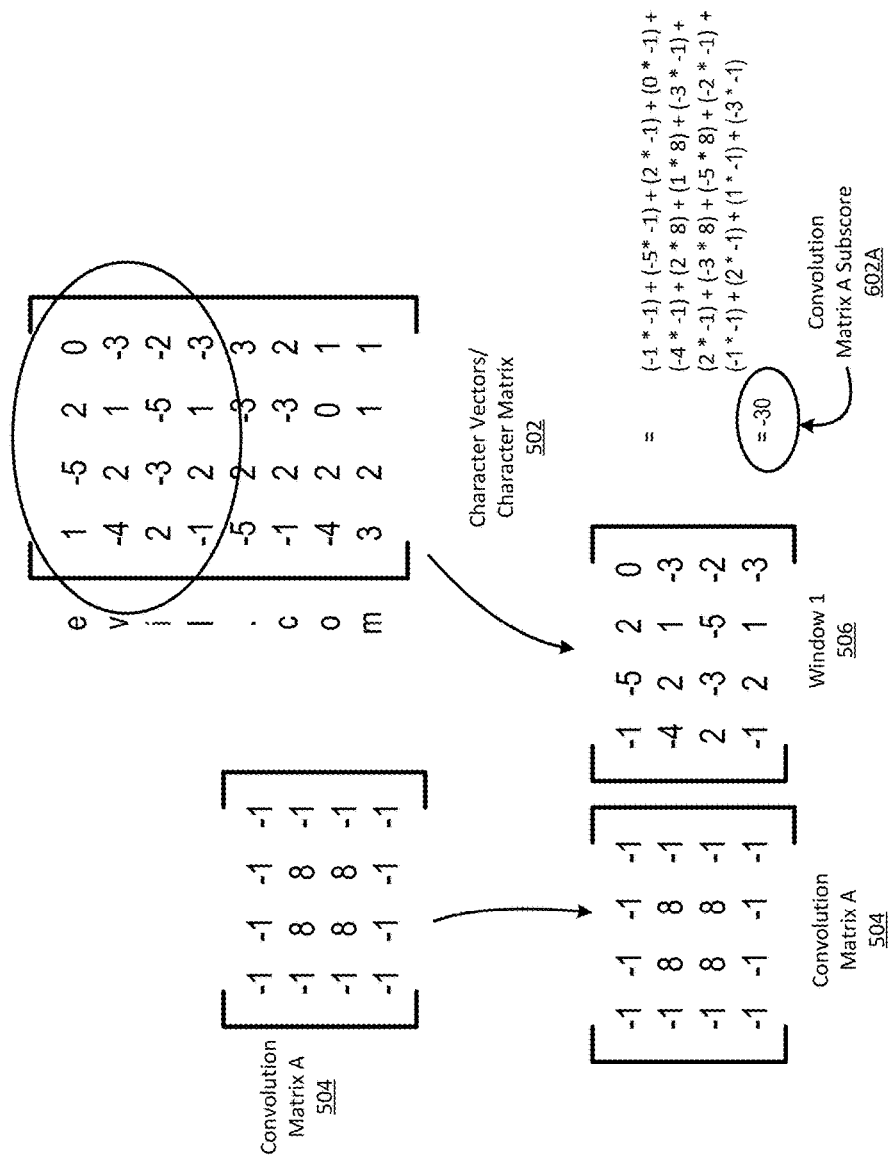
FIGS. 6A-B are diagrams illustrating calculating convolution matrix subscores and generating a feature vector, according to an embodiment
Figure 6B:
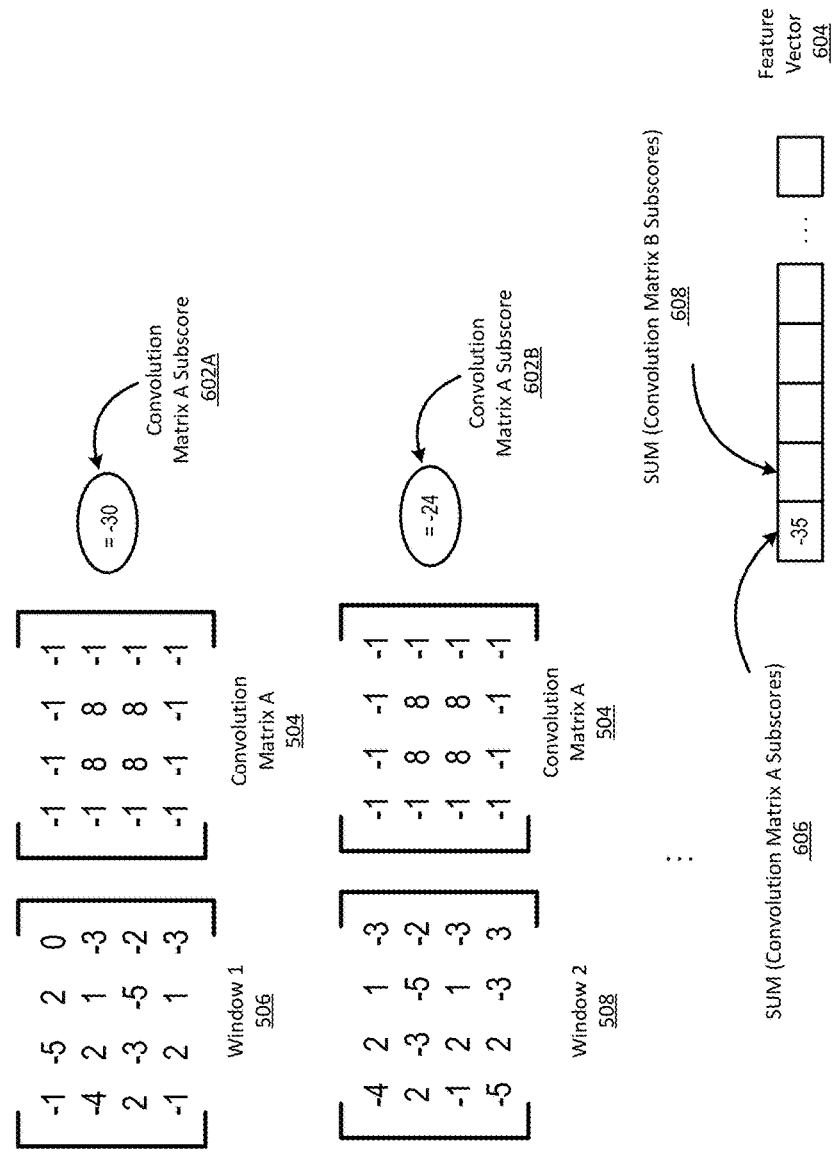

FIGS. 6A-6B are diagrams illustrating calculating convolution matrix subscores and generating a feature vector, according to an embodiment. For example, in some implementations, the at least one processor 204 can select a first window 506 of the character matrix 502. In some implementations, the first window 506 can be a similar dimension as the convolution matrix (e.g., if the convolution matrix is a 4×4 matrix, the first window 506 may be a 4×4 window of the character matrix 502); in some implementations, the first window 506 can be of a different dimension as the convolution matrix. The at least one processor 204 can also receive at least one convolution matrix, e.g., including convolution matrix A 504. The at least one processor 204 can perform mathematical convolution on the two matrices, so as to generate a convolution matrix subscore (e.g., convolution matrix A subscore 602A).

For example, to perform mathematical convolution, the at least one processor 204 can flip the rows and columns of convolution matrix A 504, and can multiply each value at a given index of convolution matrix A 504, to the value at a corresponding index of the first window 506. Thus, for example, the at least one processor 204 can multiply the values at index [1,1] of both of the first window 506 and the flipped convolution matrix A 504 (e.g., −1*−1), can multiply the values at index [1,2] of both of the first window 506 and the flipped convolution matrix A 504 (e.g., −1*−5), and so on. Said another way, the at least one processor 204 can multiply the value at index [1,1] of the first window 506 and the value at index [4,4] of the original convolution matrix A 504 (e.g., −1*−1), can multiply the value at [1,2] of the first window 506 and the value at index [4, 3] of the original convolution matrix 504 (e.g., −5*−1), and so on. The at least one processor 204 can add the product of each multiplication operation to generate the convolution matrix A subscore 602A.

Referring to FIG. 6B, the at least one processor 204 can perform a similar mathematical convolution calculation for the matrix formed by the second window 508, and convolution matrix A 504, to generate a second convolution matrix subscore (e.g., convolution matrix A subscore 602B). Each convolution matrix subscore calculated using convolution matrix A 504 can be combined (e.g., added, averaged, and/or the like) to define a convolution matrix score 606 that can be stored in a feature vector 604. The feature vector 604 can include an index for each convolution matrix that is applied to the character matrix 502 by the at least one processor 204. The at least one processor 204 can perform similar mathematical convolution calculations using other convolution matrices (e.g., including a convolution matrix B), and can include the resulting convolution matrix score (e.g., convolution matrix score 608) to the feature vector 604. As another example (not shown), a second convolution matrix (e.g., convolution matrix B) can be a 3×3 matrix including the following values:

$$\text{Convolution Matrix } B = \begin{bmatrix} -1 & 0 & 2 \\ 2 & 3 & 1 \\ 0 & 2 & -5 \end{bmatrix}$$

The at least one processor 204 can generate new windows from the character matrix that match the dimensions of convolution matrix B (e.g., can generate 3×3 windows of the character matrix), such that a first window includes the values:

$$\text{First window}_{convolution\ matrix\ B} = \begin{bmatrix} 1 & -5 & 2 \\ -4 & 2 & 1 \\ 1 & -3 & -5 \end{bmatrix}$$

The at least one processor 204 can then perform mathematical convolution with the first window and convolution matrix B, so as to generate a convolution matrix B subscore (e.g., −2). The at least one processor can select a second window:

$$\text{Second window}_{convolution\ matrix\ B} = \begin{bmatrix} -5 & 2 & 0 \\ 2 & 1 & -3 \\ -3 & -5 & -2 \end{bmatrix}$$

and can repeat the mathematical convolution calculation using the second window and convolution matrix B. Each of the subscores generated using convolution matrix B can then be combined, and stored at the index for convolution matrix B in the feature vector 604. In other implementations, the at least one processor 204 may not generate new windows for the character matrix, for each convolution matrix. In such implementations, mathematical convolution can be calculated using the same windows (e.g., window 1 506, window 2 508, window 3 510, and so on) with each convolution matrix. In other implementations, instead of calculating the convolution matrix subscores using mathematical convolution, the at least one processor 204 can use dot product calculations, and/or similar calculations, to calculate the convolution matrix subscores.

The at least one processor 204 can continue to calculate convolution matrix scores, and add them to the feature vector 604, until the at least one processor 204 has applied each retrieved convolution matrix to the character matrix 502. In some implementations, for example, the at least one processor 204 can calculate 1024 convolution matrix scores using 1024 different convolution matrices. Moreover, in some instances, the size of the window(s) can be based on a number of characters to be analyzed by the convolution matrix and a size of each character vector used to represent the characters of the string. For example, if the size of each character vector is four (e.g., as shown in the examples of FIGS. 5-6B), each window can have a size of N×4, where N is the number of characters to be analyzed for that window. In some implementations, for example, the at least one processor can apply 256 convolution matrices with a window size of 2×4, 256 convolution matrices with a window size of 3×4 and 256 convolution matrices with a window size of 4×4. This can generate 1024 convolution matrix values, one for each applied convolution matrix, that can be stored in the feature vector.

In other instances, any other number of convolution matrices can be applied using any suitable window sizes. For example, in other instances, the window size may not be based on the size of each character vector and one or more windows can instead have a size that analyzes a predetermined number of values in a character vector that is less than the full character vector. For example, if each character vector has a size of 4, a window can have a size of N×2, where the first two values in each character vector are included in the window and the last two values in each character vector are not included in the window. In other instances, the windows can have any suitable size. In some implementations, the convolution matrix scores can be added to the feature vector 604 in a predetermined order. In other implementations, the convolution matrix scores can be added to the feature vector 604 in any order.

Figure 7:
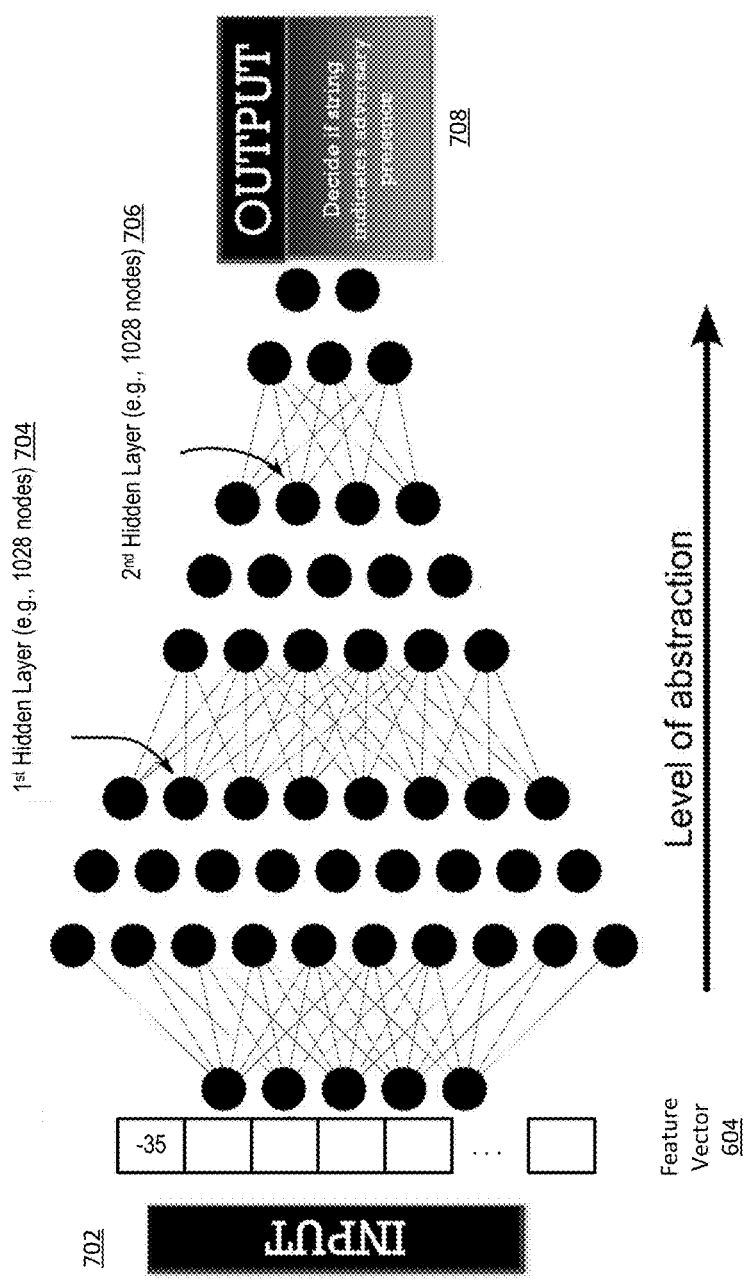
FIG. 7 illustrates a method of using a feature vector with a threat model, according to an embodiment.

FIG. 7 illustrates a diagram for using a feature vector 604 with a threat model 208, according to an embodiment. For example, in some implementations (e.g., when the threat model 208 is a deep neural network threat model), the feature vector 604 can be provided as input to input nodes of the deep neural network threat model 208. The deep neural network threat model can include an input layer of nodes 702, multiple hidden layers of nodes 704-706, and an output layer 708 including a single binary node. The values in the feature vector 604 can be propagated through the deep neural network threat model 208 to generate a binary value at the output node that indicates whether or not an artifact associated with the string may be malicious. For example, an output value that is equal to and/or approximately "1" can indicate that the string suggests that the artifact may be malicious. As another example, an output value that is equal to and/or approximately "0" can indicate that the string suggests that the artifact may be benign. The at least one processor 204 can round the output value to the nearest whole number (e.g., "0" or "1") to determine which output has been calculated by the deep neural network threat model 208.

In other instances, the values in the feature vector 604 can be propagated through the deep neural network threat model 208 to generate a numeric value within a certain numeric range at the output node that indicates whether or not an artifact associated with the string may be malicious. The numeric range can be defined in continuum within a maximum numeric value that can be generated by the deep neural network threat model 208 and a minimum numeric value that can be generated by the deep neural network threat model 208. Further, the numeric value generated at the output node can be normalized for other ranges. In some instances, the deep neural network threat model 208 can have a pre-defined threshold value to avoid the occurrence false negatives and/or false positives. The numeric value generated at the output node can be compared with the threshold value to indicate whether or not an artifact associated with the string may be malicious. Furthermore, in some instances, the comparison can be used to indicate the level of maliciousness of the artifact associated with the string (for example, low-level malicious, medium-level malicious, high-level malicious and/or the like). For example, an output value can be within a range between 0 and 1. Based on comparison with a pre-defined threshold value between 0 and 1, the artifact can be determined to be malicious or not.

In some implementations, the output layer 708 can include multiple output nodes that can indicate multiple different outcomes. For example, the output layer 708 can include a number of nodes equal to a number of potential rankings a malicious artifact may have (e.g., an output node for "benign," an output node for "suspicious," an output node for "highly dangerous," and/or the like). In such implementations, the at least one processor 204 can determine the results of processing the feature vector by determining the output node with the highest output value. For example, if the output node associated with a "benign" ranking outputs the highest output value, the at least one processor 204 can determine that the artifact associated with the string is benign, and so on.

In some implementations, the activation functions of each node in the deep neural network threat model 208 can include rectified linear units. To train the network, the at least one processor 204 can use an 'Adam' optimizer (e.g., a variant of minibatch stochastic gradient descent with momentum), supervised backpropagation and/or other similar methods. In some implementations, the deep neural network threat model 208 can include fully-connected layers of nodes, with the input layer 702 and each of the hidden layers 704-706 including a number of nodes equal to the size of the feature vector. Further details relating to propagating input through a deep neural network threat model can be found in co-pending application Ser. No. 62/201,263, entitled "METHODS AND APPARATUS FOR MACHINE LEARNING BASED MALWARE DETECTION"), which is incorporated herein by reference in its entirety. In some implementation, such training can extend to other portions of the system and/or process. For example, back propagation can be used to train and/or optimize the character vectors and/or the convolution matrix. In some implementations, the hidden layers may be arranged and/or connected such that each pass through each hidden layer results in a higher level of abstraction. The at least one processor 204 can then take subsequent actions based on the output value (e.g., can notify an analyst of the deep neural network threat model's determination, can quarantine and/or delete, and/or send a signal to instruct another device to quarantine and/or delete, the artifact associated with the string, and/or can perform other actions).

Figure 8:
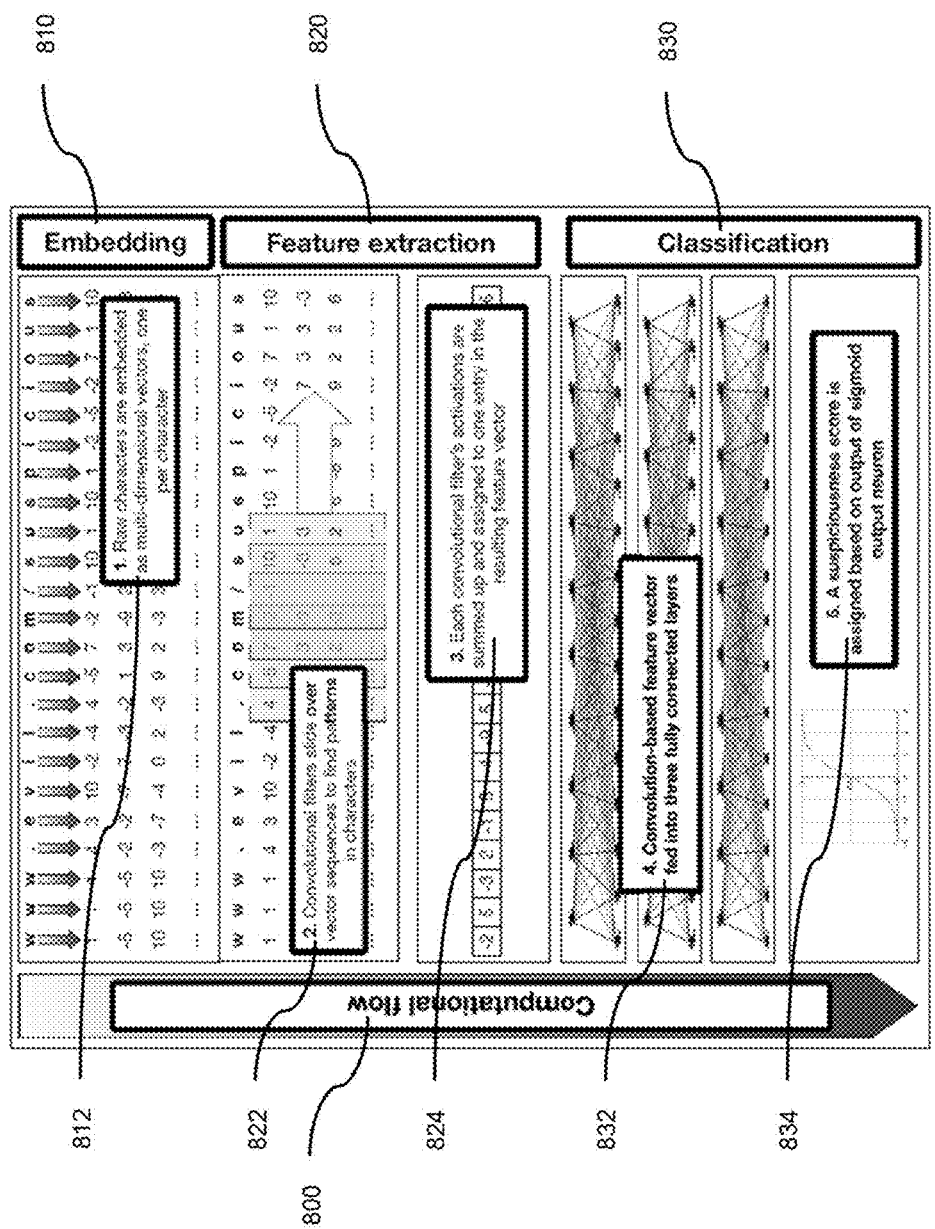
FIG. 8 is an overview diagram illustrating an architecture of an example neural network system used to identify potential malware, according to an embodiment.

FIG. 8 is an overview diagram illustrating an architecture of an example neural network system used to identify potential malware, according to an embodiment. A computational flow 800 of the neural network system can be divided into three phases based on function namely, a character embedding phase 810, a feature extraction phase 820 and a classification phase 830. The character embedding phase 810, the feature extraction phase 820 and the classification phase 830 (and functions associated by these phases) can be implemented by a processor (e.g., processor 204 shown and described with respect to FIG. 2).

During the character embedding phase 810, the processor (e.g., processor 204 shown and described with respect to FIG. 2) receives an input string including a sequence of characters. The input string can be a URL, filepath, registry key and/or the like. The processor can process the received input string to be encoded (and/or embedded) into a multi-dimensional tensor (and/or into a multi-dimensional vector sequence, and/or multi-dimensional feature space), with one vector per character. In some instances, the processor can process the received input string more than 2 characters at a time. As shown in FIG. 8, the character embedding phase 810 receives a URL 'www.evil.com/suspicious' as an input string. At 812, a processor can process each character in the URL 'www.evil.com/suspicious' into a multi-dimensional vector. The processing can be performed on each character of the URL 'www.evil.com/suspicious' to generate a set of character vectors (also referred to herein as a character matrix).

For example, at 812, the received input string (here a URL) includes "evil.com". The processor implementing the character embedding phase 810 can embed the input string into a multi-dimensional vector by generating a first vector for the character 'e,' a second vector for the character 'v,' and so on. In some implementations, each character vector can be a 100-dimensional vector, and the values included in the character vector can be based on the Unicode value of that character (e.g., can be the Unicode value for that character, can be a hash value of the Unicode value, and/or can be a similar transformation of the Unicode value). In other implementations, the character vector can be of a different dimension, and/or can include values generated based on various other types of character encoding, such as American Standard Code for Information Interchange (ACSII), and/or similar character encoding schema. As discussed above, characters having similar features, attributes and/or characteristics can have similar character vectors. Such character vectors can be indicative of a semantic meaning and/or characterization of the characters.

During the feature extraction phase 820, the processor can use the character matrix (generated from the character embedding phase 810) to detect a sequence pattern within the character sequence and generate a feature vector. The feature extraction phase 820 can be divided into two stages (822 and 824) as described herein.

At 822, the processor detects a sequence pattern within the character sequence of the character matrix. In some instances, the detection of sequence pattern involves applying a convolution matrix over vector sequences for characters in the character matrix. The convolution matrix can be applied to various windows of the character matrix as shown and described with respect to FIG. 5. In some instances, multiple convolution matrices can be applied to the character matrix for detecting different sequence patterns.

At 824, the processor aggregates the sequence pattern information by calculating a resulting value for each convolution matrix applied to the character matrix. Specifically, a subscore for each window to which a convolution matrix is applied can be combined with a subscore for the remaining windows to which that convolution matrix is applied. This can be done for each convolution matrix applied to the character matrix. The resulting values can be stored in a feature vector having a value for each convolution matrix applied to the character matrix. Further details regarding defining the feature vector are shown and described with respect to FIG. 6A and FIG. 6B.

The classification phase 830 involves a dense neural network classifying the input string as malicious or benign. The dense neural network includes two threat detection models, a Dense(1) unit, at 832, and a, DenseSigmoid(1) unit, at 834.

At 832, Dense(1) unit can be an arrangement of a three layer fully connected linear unit with output size 1, followed by rectifier linear unit (ReLU) non-linear activation (e.g., executed by a processor such as processor 204 shown and described with respect to FIG. 2). The convolution-based feature vector generated from the feature extraction phase 820 is provided to the Dense(1) unit (e.g., as an input to the Dense(1) unit. The processor can perform layer-wise batch normalization (e.g., BatchNorm) and/or Drop out (e.g., DropOut(p)) functions. At 834, DenseSigmoid(1) unit processes the values obtained from Dense(1) unit to generate a decision value in determining whether the received input string is malicious or benign. For example, DenseSigmoid (1) can assign a suspiciousness score based on output of sigmoid output neuron.

Figure 9:
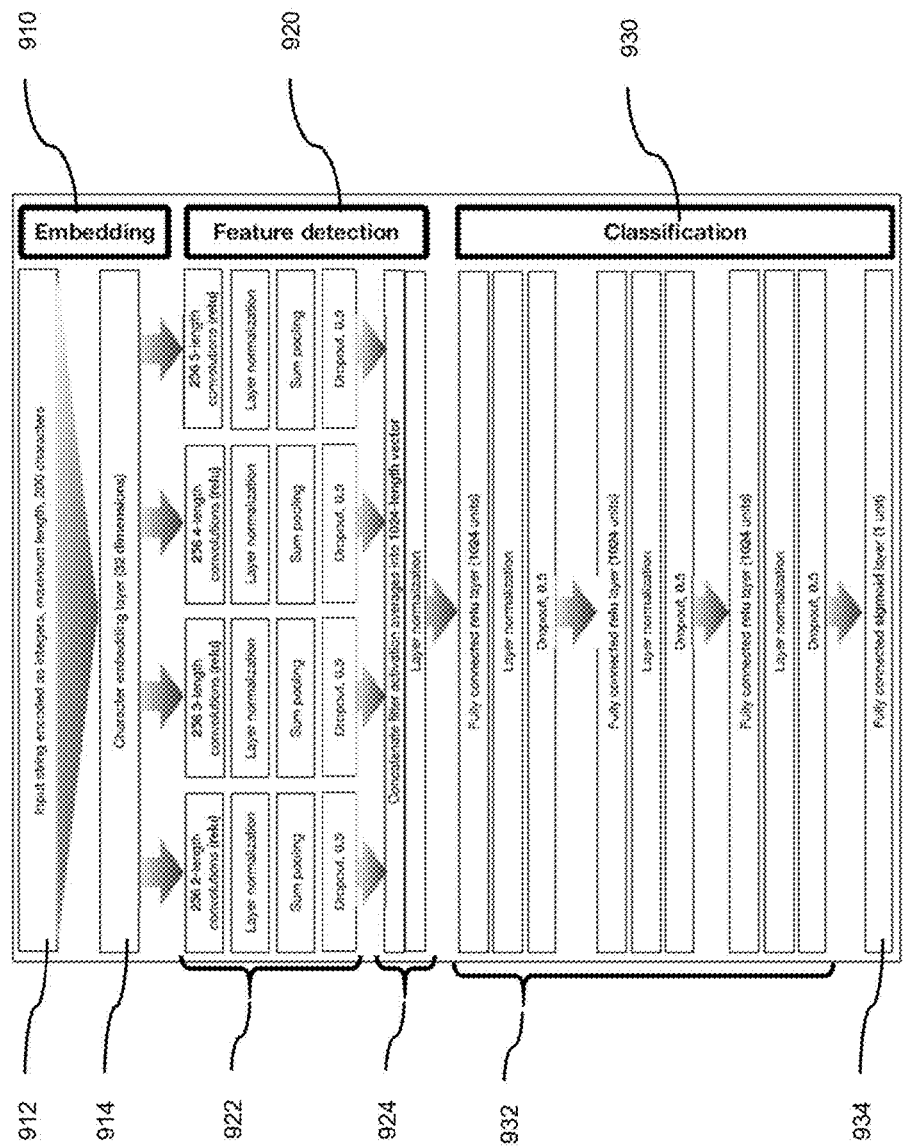
FIG. 9 is a diagram illustrating an example architecture of a Convolutional Neural Network (CNN) system used to identify potential malware, according to an embodiment.

FIG. 9 is a diagram illustrating an example architecture of a Convolutional Neural Network (CNN) system, according to an embodiment. The architecture of the CNN system can be divided into three phases based on function namely, a character embedding phase 910, a feature detection phase 920 and a classification phase 930. The character embedding phase 910, the feature extraction phase 920 and the classification phase 930 can be implemented by a processor (e.g., processor 204 shown and described with respect to FIG. 2).

During the character embedding phase 910, the processor (e.g., processor 204 shown and described with respect to FIG. 2) receives an input string including a sequence of characters. The input string can be a URL, filepath, registry key and/or the like. The character embedding 910 phase can include a first process 912 involving converting the input character string into integers and second process 914 involving character embedding. The details of character embedding phase 910 are shown and described with respect to FIG. 8.

During the feature detection phase 920, the processor uses a character matrix (generated from the character embedding phase 910) to detect a sequence pattern within the character matrix and generate a feature vector. Specifically, at 922, the processor detects a sequence pattern within the character sequence of the character matrix using one or more convolution matrices. The detection of a sequence pattern involves applying one or more convolution matrices to vector sequences for characters present in the character matrix. The detection can include layer normalization, sum pooling and/or drop out functions on the character matrix. In some instances, multi-length convolution matrices (e.g., 256 2-length convolutions, 256 3-length convolutions, 256 4-length convolutions, 256 5-length convolutions and so on) can be used to detect features. Moreover, to increase the speed of model training and prevent overfitting, the feature detection phase 920 can use at least one of the layer normalization (e.g. BatchNorm) and/or Dropout.

At 924, the processor aggregates the sequence pattern information by calculating a resulting value for each convolutional matrix applied to the character matrix. Specifically, a subscore for each window to which a convolution matrix is applied can be combined with a subscore for the remaining windows to which that convolution matrix is applied. This can be done for each convolution matrix applied to the character matrix. The resulting values can be stored in a feature vector having a value for each convolution matrix applied to the character matrix. Further details regarding defining the feature vector are shown and described with respect to FIG. 6A and FIG. 6B. In some instances, the processor can also perform layer normalization. For example, the processor can concatenate convolution matrix averages into a pre-defined length vector (e.g. 1024-length vector).

The classification phase 930 involves a convolutional neural network classifying the input string as malicious or benign. The convolutional neural network includes two threat detection models, a Dense(1) unit, at 932, and a DenseSigmoid(1) unit, at 934. Details of the classification phase 930 are shown and described with respect to FIG. 8.

By using the systems and methods described herein, the malware detection device 202 can reduce the amount of resources necessary to determine whether or not artifacts are malicious, and can adaptively determine how to determine whether a given string indicates that an artifact is malicious or benign. For example, by using the systems and methods described herein, the malware detection device 202 can use a single threat model to determine the threat status of strings from multiple sources, of multiple types, and/or the like. The malware detection device 202 can determine whether the artifact associated with the string is a malicious artifact without applying multiple models to the string determine what sort of threat the artifact poses, and/or to attempt to detect multiple different indicators that would indicate that the artifact is malicious. The malware detection device 202 can use the single threat model to make each of these determinations. Thus, the malware detection device 202 can save time training threat models, and can lead to more efficient modelling (e.g., can allow storage of a single model rather than multiple models, and can reduce the time processing strings by processing the strings with one model, rather than with several). Furthermore, because the threat model is trained to learn how to detect the malicious artifacts via analysis of strings, the threat model is inherently also trained to learn how to detect indicators that suggest when a particular artifact may be malicious, and which indicators are most relevant to which types of strings, which string sources, and/or the like. Thus, the malware detection device 202 can determine how to analyze particular strings based on the learning process, and can process strings without an analyst manually providing a list of factors for the malware detection device 202 to analyze. Therefore, the systems and methods herein also allow the malware detection device 202 to adaptively learn how to classify strings and/or artifacts, and to learn how to classify suspicious portions of strings and/or artifacts, without any hard-coded rules as to what strings would or would not be suspicious.

While methods and apparatuses described above are described as being used for detecting malware, in other implementations, methods and apparatuses described herein can be used with any data processing involving making a determination about data based on a number of features of the data (e.g., including but not limited to malware, image processing, and/or the like). Additionally, while methods and apparatuses described above use a deep neural network threat model, methods and apparatuses described herein may be used with any data modeling and/or machine learning algorithm and/or model, including but not limited to decision tree models, random forest models, Bayesian networks, clustering models, and/or similar algorithms and/or models. For example, the feature vector can be input into a random forest and/or decision tree threat model to identify the input string as malicious or benign.

Moreover, in some instances a combination of threat models can be used. For example, a deep neural network threat model can be used in conjunction with a decision tree to perform a classification phase (e.g., classification phase 830 shown and described with respect to FIG. 8). For example, the output from an intermediate ReLU layer can be provided as an input to a different threat model, such as a decision tree threat model.

In still other instances, multiple threat models can be used to classify the input string. In such instances, a confidence value can be defined based on outputs from the multiple threat models. In yet other instances, based on an output of a first threat model (e.g., an uncertain output, an indication that the sting indicates a possible malicious behavior, an indication that the string indicates a possible benign behavior, etc.), the input string (or feature vector based on the input string) can be provided to a second threat model for further analysis. Based on the multiple threat models, the input string can be classified.

It is intended that the systems and methods described herein can be performed by software (stored in memory and/or executed on hardware), hardware, or a combination thereof. Hardware modules may include, for example, a general-purpose processor, a field programmable gate array (FPGA), and/or an application specific integrated circuit (ASIC). Software modules (executed on hardware) can be expressed in a variety of software languages (e.g., computer code), including Unix utilities, C, C++, Java™, Ruby, SQL, SAS®, the R programming language/software environment, Visual Basic™, and other object-oriented, procedural, or other programming language and development tools. Examples of computer code include, but are not limited to, micro-code or micro-instructions, machine instructions, such as produced by a compiler, code used to produce a web service, and files containing higher-level instructions that are executed by a computer using an interpreter. Additional examples of computer code include, but are not limited to, control signals, encrypted code, and compressed code. Each of the devices described herein can include one or more processors as described above.

Some embodiments described herein relate to devices with a non-transitory computer-readable medium (also can be referred to as a non-transitory processor-readable medium or memory) having instructions or computer code thereon for performing various computer-implemented operations. The computer-readable medium (or processor-readable medium) is non-transitory in the sense that it does not include transitory propagating signals per se (e.g., a propagating electromagnetic wave carrying information on a transmission medium such as space or a cable). The media and computer code (also can be referred to as code) may be those designed and constructed for the specific purpose or purposes. Examples of non-transitory computer-readable media include, but are not limited to: magnetic storage media such as hard disks, floppy disks, and magnetic tape; optical storage media such as Compact Disc/Digital Video Discs (CD/DVDs), Compact Disc-Read Only Memories (CD-ROMs), and holographic devices; magneto-optical storage media such as optical disks; carrier wave signal processing modules; and hardware devices that are specially configured to store and execute program code, such as Application-Specific Integrated Circuits (ASICs), Programmable Logic Devices (PLDs), Read-Only Memory (ROM) and Random-Access Memory (RAM) devices. Other embodiments described herein relate to a computer program product, which can include, for example, the instructions and/or computer code discussed herein.

While various embodiments have been described above, it should be understood that they have been presented by way of example only, and not limitation. Where methods and steps described above indicate certain events occurring in certain order, the ordering of certain steps may be modified. Additionally, certain of the steps may be performed concurrently in a parallel process when possible, as well as performed sequentially as described above. Although various embodiments have been described as having particular features and/or combinations of components, other embodiments are possible having any combination or sub-combination of any features and/or components from any of the embodiments described herein. Furthermore, although various embodiments are described as having a particular entity associated with a particular compute device, in other embodiments different entities can be associated with other and/or different compute devices.

What is claimed is:

1. An apparatus, comprising:
 a memory; and
 a processor operatively coupled to the memory, the processor configured to:
  receive a Uniform Resource Locator (URL) associated with a web site;
  convert each character in the URL into a vector of values to define a character matrix;
  apply a first convolution matrix to a first set of values within the character matrix to define a first subscore;
  apply the first convolution matrix to a second set of values within the character matrix to define a second subscore;
  calculate a sum based on the first subscore and the second subscore to define a score for the first convolution matrix;
  apply a second convolution matrix to the first set of values within the character matrix to define a third subscore;
  apply the second convolution matrix to the second set of values within the character matrix to define a fourth subscore;
  calculate a sum based on the third subscore and the fourth subscore to define a score for the second convolution matrix;
  provide the score for the first convolution matrix and the score for the second convolution matrix as inputs to a machine learning threat model;
  identify an artifact associated with the URL as malicious based on an output of the machine learning threat model meeting a predefined criterion; and
  quarantine the artifact associated with the URL based on the identifying the URL as malicious.

2. The apparatus of claim 1, wherein the processor is configured to select the first convolution matrix and the second convolution matrix based on at least one characteristic of the URL.

3. The apparatus of claim 1, wherein the machine learning threat model is at least one of a deep neural network threat model, a decision tree model, a Bayesian network or a clustering model.

4. The apparatus of claim 1, wherein the first set of values is different from the second set of values, at least one value from the first set of values being within the second set of values.

5. The apparatus of claim 1, wherein the first set of values and the second set of values are from a plurality of sets of values within the character matrix, a number of sets of values within the plurality of sets of values being based on a number of characters in the URL,
the processor configured to calculate the sum to define the score for the first convolution matrix based on a subscore associated with each set of values from the plurality of sets of values within the character matrix.

6. A non-transitory processor-readable medium storing code representing instructions to be executed by a processor, the code comprising code to cause the processor to:
receive an input string associated with a potentially malicious artifact;
convert each character in the input string into a vector of values to define a character matrix;
select a convolution matrix;
apply the convolution matrix to a first window of the character matrix to define a first sub score;
apply the convolution matrix to a second window of the character matrix to define a second sub score;
combine the first sub score and the second sub score to define a score for the convolution matrix;
provide the score for the convolution matrix as an input to a machine learning threat model;
identify the potentially malicious artifact associated with the input string as malicious based on an output of the machine learning threat model; and
perform a remedial action on the potentially malicious artifact based on identifying the potentially malicious artifact as malicious.

7. The non-transitory processor-readable medium of claim 6, wherein the convolution matrix is a first convolution matrix and the input is a first input, the code further comprising code to cause the processor to:
apply a second convolution matrix to the first window of the character matrix to define a third sub score;
apply the second convolution matrix to the second window of the character matrix to define a fourth sub score; and
combine the third sub score and the fourth sub score to define a score for the second convolution matrix, the code to cause the processor to provide including code to cause the processor to provide the score for the second convolution matrix as a second input to the machine learning threat model.

8. The non-transitory processor-readable medium of claim 6, wherein the machine learning threat model is at least one of a deep neural network threat model, a decision tree model, a Bayesian network or a clustering model.

9. The non-transitory processor-readable medium of claim 6, wherein the code to cause the processor to select the convolution matrix includes code to cause the processor to select the convolution matrix based at least in part on a type of the input string.

10. The non-transitory processor-readable medium of claim 6, wherein the remedial action includes at least one of deleting the potentially malicious artifact, quarantining the potentially malicious artifact, or sending a notification indicating that the potentially malicious artifact is malicious.

11. The non-transitory processor-readable medium of claim 6, wherein the code to cause the processor to combine includes code to cause the processor to calculate a sum based on the first subscore and the second subscore to define the score for the convolution matrix.

12. The non-transitory processor-readable medium of claim 6, wherein the code to cause the processor to combine includes code to cause the processor to calculate an average based on the first subscore and the second subscore to define the score for the convolution matrix.

13. The non-transitory processor-readable medium of claim 6, wherein:
the first window includes a first set of values included in the second window;
the first window includes a second set of values not included in the second window; and
the second window includes a third set of values not included in the first window.

14. The non-transitory processor-readable medium of claim 6, wherein the input string includes at least one of a Uniform Resource Locator (URL), a filepath, or a registry key.

15. The non-transitory processor-readable medium of claim 6, wherein the first window and the second window are from a plurality of windows within the character matrix, a number of windows within the plurality of windows being based on a number of characters in the input string,
the code to cause the processor to combine includes code to cause the processor to combine a sub score for each window from the plurality of windows with a sub score for the remaining windows from the plurality of windows to define the score for the convolution matrix.

16. A method, comprising:
receiving a Uniform Resource Locator (URL) associated with a website;
converting each character in the URL into a vector of values to define a character matrix;
applying a first convolution matrix to a set of values within the character matrix to define at least a portion of a first score;
applying a second convolution matrix to the set of values within the character matrix to define at least a portion of a second score;
providing the first score and the second score as inputs to a machine learning threat model;
identifying an artifact associated with the URL as malicious based on an output of the machine learning threat model meeting a predefined criterion; and
performing a remedial action on the artifact based on identifying the artifact as malicious.

17. The method of claim 16, further comprising:
selecting the first convolution matrix and the second convolution matrix based on at least one characteristic of the URL associated with the website.

18. The method of claim 16, wherein the machine learning threat model is at least one of a deep neural network threat model, a decision tree model, a Bayesian network or a clustering model.

19. The method of claim 16, wherein the remedial action includes at least one of deleting the artifact, quarantining the artifact, or sending a notification indicating that the artifact is malicious.

20. The method of claim 16, wherein the set of values is a first set of values and the applying the first convolution matrix includes applying the first convolution matrix to the first set of values to define a first subscore, the method further comprising:

applying the first convolution matrix to a second set of values within the character matrix to define a second subscore; and combining the first subscore and the second subscore to define the first score by calculating a sum based on the first subscore and the second subscore.

21. The method of claim 16, wherein the set of values is a first set of values and the applying the first convolution matrix includes applying the first convolution matrix to the first set of values to define a first subscore, the method further comprising:

applying the first convolution matrix to a second set of values within the character matrix to define a second subscore; and combining the first subscore and the second subscore to define the first score by calculating an average based on the first subscore and the second subscore.

22. The method of claim 16, wherein the set of values is a first set of values, the method further comprising:

applying the first convolution matrix to a second set of values different from the first set of values.

* * * * *